United States Patent
Chin et al.

(10) Patent No.: US 11,419,170 B2
(45) Date of Patent: Aug. 16, 2022

(54) RADIO ACCESS TECHNOLOGY PING-PONG RESELECTION AND REGISTRATION AVOIDANCE

(71) Applicant: QUALCOMM Incorporated, San Diego, CA (US)

(72) Inventors: Tom Chin, San Diego, CA (US); Ozcan Ozturk, San Diego, CA (US); Xipeng Zhu, San Diego, CA (US); Shanshan Wang, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/828,440

(22) Filed: Mar. 24, 2020

(65) Prior Publication Data
US 2020/0323005 A1  Oct. 8, 2020

Related U.S. Application Data

(60) Provisional application No. 62/828,312, filed on Apr. 2, 2019.

(51) Int. Cl.
*H04W 76/15* (2018.01)
*H04W 76/27* (2018.01)
*H04W 36/00* (2009.01)

(52) U.S. Cl.
CPC ....... *H04W 76/15* (2018.02); *H04W 36/0055* (2013.01); *H04W 76/27* (2018.02)

(58) Field of Classification Search
CPC .. H04W 76/15; H04W 76/27; H04W 36/0055

USPC .................................................. 370/311, 331
See application file for complete search history.

(56) References Cited

U.S. PATENT DOCUMENTS

| | | | |
|---|---|---|---|
| 2014/0106764 A1* | 4/2014 | Huang | H04W 72/1226 455/452.1 |
| 2014/0241182 A1* | 8/2014 | Smadi | H04W 36/20 370/252 |
| 2016/0142960 A1 | 5/2016 | Liu et al. | |
| 2016/0192269 A1 | 6/2016 | Kim et al. | |
| 2017/0295568 A1 | 10/2017 | Takeda et al. | |
| 2017/0331577 A1* | 11/2017 | Parkvall | H04B 7/0848 |
| 2018/0146407 A1* | 5/2018 | Zhang | H04W 36/0005 |
| 2018/0176934 A1* | 6/2018 | Uchino | H04W 72/085 |

(Continued)

OTHER PUBLICATIONS

International Search Report and Written Opinion—PCT/US2020/024703—ISA/EPO—dated Jun. 22, 2020.

(Continued)

*Primary Examiner* — Mong-Thuy T Tran
(74) *Attorney, Agent, or Firm* — Harrity & Harrity, LLP

(57) ABSTRACT

Various aspects of the present disclosure generally relate to wireless communication. In some aspects, a network device may determine that a ping-pong condition is satisfied with regard to a Long Term Evolution (LTE) radio access technology (RAT) and a New Radio (NR) RAT. The network device may configure a dual connectivity mode for the UE based at least in part on the ping-pong condition being satisfied. The network device may cause the UE to deprioritize the NR RAT based at least in part on the ping-pong condition being satisfied. Numerous other aspects are provided.

31 Claims, 8 Drawing Sheets

(56) References Cited

U.S. PATENT DOCUMENTS

| | | | | |
|---|---|---|---|---|
| 2018/0220344 A1* | 8/2018 | Shaheen | ................ | H04W 4/60 |
| 2018/0242386 A1* | 8/2018 | Ke | ........................ | H04W 76/18 |
| 2019/0373523 A1* | 12/2019 | Panchai | ............... | H04W 76/27 |
| 2021/0037595 A1* | 2/2021 | Jin | ........................ | H04L 5/0094 |
| 2021/0337615 A1* | 10/2021 | Rugeland | ............. | H04W 76/27 |

OTHER PUBLICATIONS

NTT Docomo, et al., "MCG/SCG Configuration for LTE-NR Dual Connectivity", 3GPP Draft, 3GPP TSG-RAN WG2 #98, R2-1704192, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051274783, 8 pages, Retrieved from the Internet: URL: http://www.3gpp.org/ftp/Meetings_3GPP_SYNC/RAN2/Docs/. [retrieved on May 14, 2017] pp. 2. 3. 6.
Huawei, et al., "DC Based NR Scheme for 0ms Interruption Handover", 3GPP Draft, 3GPP TSG-RAN WG2 #100, R2-1712510, DC Based NR Scheme for 0ms Interruption Handover, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 27, 2017-Dec. 1, 2017, Nov. 17, 2017 (Nov. 17, 2017), XP051371510, 7 pages, Retrieved from the Internet: URL: http://www.3gpp.org/ftp/tsg%5Fran/WG2%5FRL2/TSGR2%5F100/Docs/. [retrieved on Nov. 17, 2017] pp. 1-2.

* cited by examiner

RADIO ACCESS TECHNOLOGY PING-PONG RESELECTION AND REGISTRATION AVOIDANCE

CROSS-REFERENCE TO RELATED APPLICATION

This patent application claims priority to Provisional Patent Application No. 62/828,312, filed on Apr. 2, 2019, entitled "RADIO ACCESS TECHNOLOGY PING-PONG RESELECTION AND REGISTRATION AVOIDANCE," and assigned to the assignee hereof. The disclosure of the prior application is considered part of and is incorporated by reference in this patent application.

FIELD OF THE DISCLOSURE

Aspects of the present disclosure generally relate to wireless communication, and to techniques and apparatuses for radio access technology (RAT) ping-pong reselection and registration avoidance.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a ping-pong condition is satisfied with regard to a Long Term Evolution (LTE) radio access technology (RAT) and a New Radio (NR) RAT; and transmitting an indication to configure a dual connectivity mode for the UE based at least in part on the ping-pong condition being satisfied.

In some aspects, a UE for wireless communication may include memory and one or more processors operatively coupled to the memory. The memory and the one or more processors may be configured to determine that a ping-pong condition is satisfied with regard to an LTE RAT and an NR RAT; and transmit an indication to configure a dual connectivity mode for the UE based at least in part on the ping-pong condition being satisfied.

In some aspects, a non-transitory computer-readable medium may store one or more instructions for wireless communication. The one or more instructions, when executed by one or more processors of a UE, may cause the one or more processors to: determine that a ping-pong condition is satisfied with regard to an LTE RAT and an NR RAT; and transmit an indication to configure a dual connectivity mode for the UE based at least in part on the ping-pong condition being satisfied.

In some aspects, an apparatus for wireless communication may include means for determining that a ping-pong condition is satisfied with regard to an LTE RAT and an NR RAT; and means for transmitting an indication to configure a dual connectivity mode for the apparatus based at least in part on the ping-pong condition being satisfied.

In some aspects, a method of wireless communication, performed by a network device, may include determining that a ping-pong condition is satisfied with regard to an LTE RAT and an NR RAT, wherein the ping-pong condition is satisfied for a UE; and configuring a dual connectivity mode for the UE based at least in part on the ping-pong condition being satisfied; or causing the UE to deprioritize the NR RAT based at least in part on the ping-pong condition being satisfied.

In some aspects, a network device for wireless communication may include memory and one or more processors operatively coupled to the memory. The memory and the one or more processors may be configured to determine that a ping-pong condition is satisfied with regard to an LTE RAT and an NR RAT, wherein the ping-pong condition is satisfied for a UE; and configure a dual connectivity mode for the UE based at least in part on the ping-pong condition being satisfied; or cause the UE to deprioritize the NR RAT based at least in part on the ping-pong condition being satisfied.

In some aspects, a non-transitory computer-readable medium may store one or more instructions for wireless communication. The one or more instructions, when executed by one or more processors of a network device, may cause the one or more processors to: determine that a ping-pong condition is satisfied with regard to an LTE RAT and an NR RAT, wherein the ping-pong condition is satisfied for a UE; and configure a dual connectivity mode for the UE based at least in part on the ping-pong condition being satisfied; or cause the UE to deprioritize the NR RAT based at least in part on the ping-pong condition being satisfied.

In some aspects, an apparatus for wireless communication may include means for determining that a ping-pong condition is satisfied with regard to an LTE RAT and an NR RAT, wherein the ping-pong condition is satisfied for a UE; and means for configuring a dual connectivity mode for the UE based at least in part on the ping-pong condition being satisfied; or means for causing the UE to deprioritize the NR RAT based at least in part on the ping-pong condition being satisfied.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
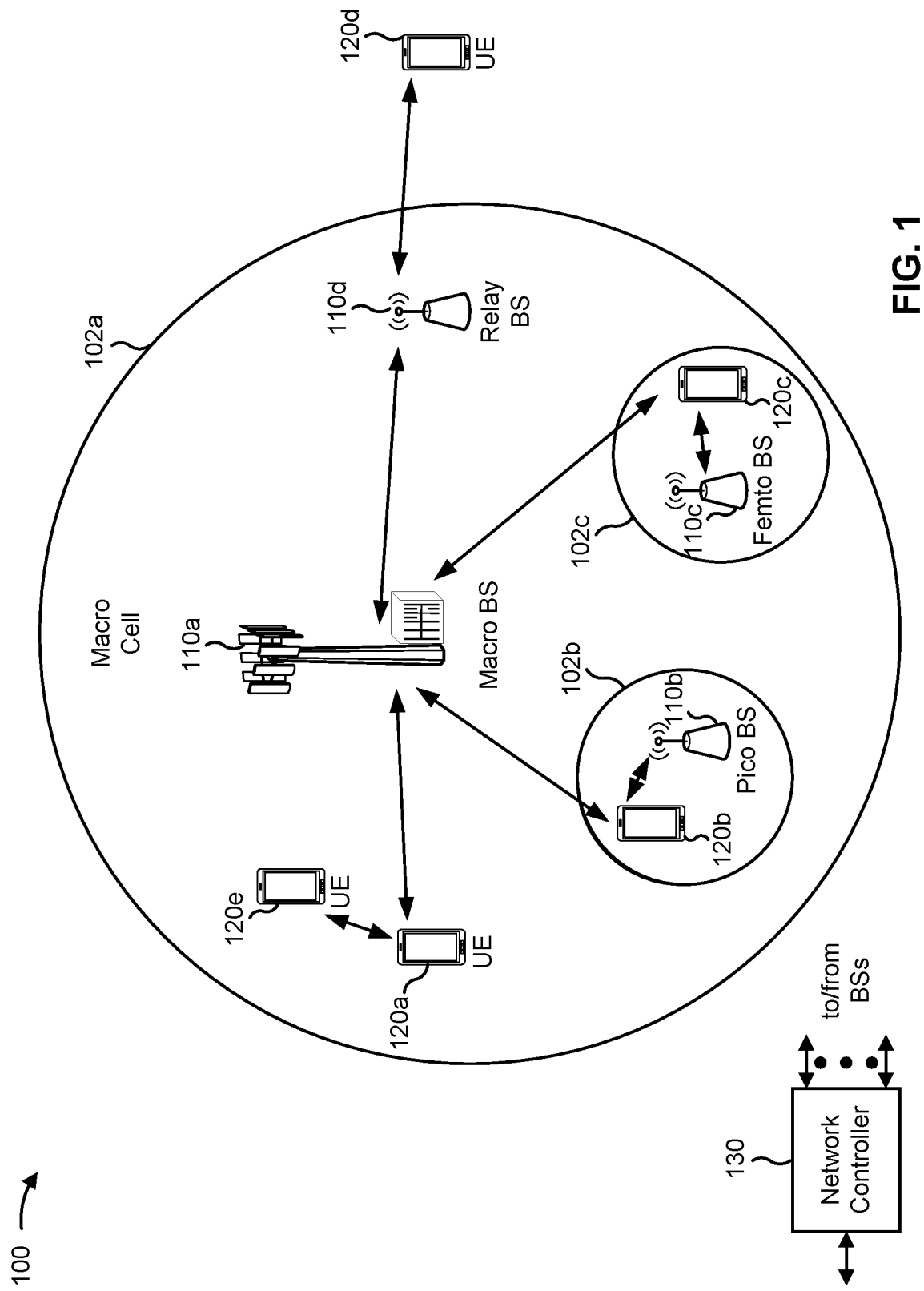
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
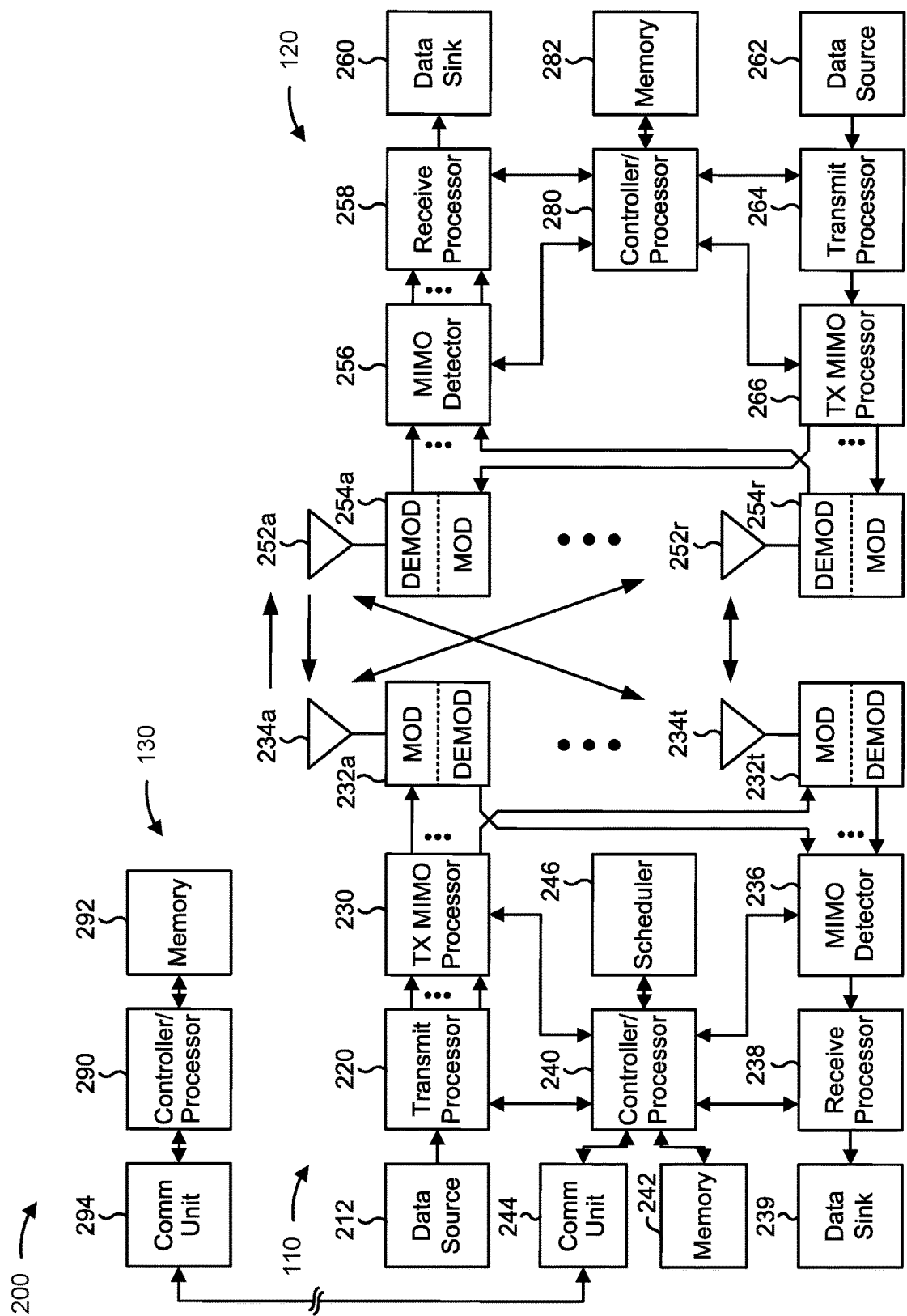
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with radio access technology (RAT) ping-pong reselection and registration avoidance, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a ping-pong condition is satisfied with regard to a Long Term Evolution (LTE) RAT and a New Radio (NR) RAT; means for transmitting an indication to configure a dual connectivity mode for the UE based at least in part on the ping-pong condition being satisfied; means for switching to the dual connectivity mode based at least in part on the indication; means for receiving a request that the UE enter the dual connectivity mode; means for performing a role switch of a network device associated with the NR RAT to a role associated with a secondary node; and/or the like. In some aspects, such means may include one or more components of UE 120 described in connection with FIG. 2.

In some aspects, a network device (e.g., BS 110, network controller 130, a 5G core network device such as an access management function (AMF), an Evolved Packet Core (EPC) device such as an LTE network device, and/or the like) may include means for determining that a ping-pong condition is satisfied with regard to an LTE RAT and an NR RAT, wherein the ping-pong condition is satisfied for a UE; means for configuring a dual connectivity mode for the UE based at least in part on the ping-pong condition being satisfied; means for causing the UE to deprioritize the NR RAT based at least in part on the ping-pong condition being satisfied; means for transmitting a radio resource control message to the UE that includes configuration information for the dual connectivity mode; means for switching the UE from a standalone mode on the NR RAT to a non-standalone mode on the NR RAT and the LTE RAT; means for configuring a base station associated with the NR RAT as a secondary node of the UE; means for requesting that the UE perform a role switch of the network device to a role associated with a secondary node; means for transmitting a radio resource control release message indicating to deprioritize the NR RAT; means for requesting that the UE enter the dual connectivity mode; and/or the like. In some aspects, such means may include one or more components of base station 110 described in connection with FIG. 2.

As indicated above, FIG. 2 is provided as an example. Other examples may differ from what is described with regard to FIG. 2.

As 5G/NR is deployed, coverage may be poor or discontinuous in some areas. "5G" is used interchangeably with "NR" herein and "LTE" is used interchangeably with "4G" herein. A UE that experiences poor NR coverage when using a standalone mode may reselect to a different RAT, such as LTE. In some cases, a UE may repeatedly reselect between NR and LTE as the conditions for reselection are repeatedly satisfied, which may be referred to as ping-ponging between NR and LTE. When the UE reselects to LTE from NR, the UE may enter a connected state (e.g., a radio resource control (RRC) connected state), and may perform a tracking area update (TAU) registration. When the UE reselects from LTE to NR, the UE may enter the connected state and may perform a registration update. The frequent registration signaling caused by this ping-pong reselection drains UE power and increases signaling load. Some RATs use idle-mode signaling reduction (ISR) techniques to avoid ping-pong registration. However, ISR techniques may increase the complexity of the 5G standards, which may not be desirable.

Some techniques and apparatuses described herein provide resolution or avoidance of ping-ponging between NR and LTE using an at least partially network-based solution. For example, a network device (e.g., a 5G core network device, an LTE network device, and/or the like) may identify a ping-pong condition of a UE between an NR RAT and an LTE RAT, and may cause the UE to rectify the ping-pong condition. As another example, the UE may identify the ping-pong condition, and may provide an indication to a network device based at least in part on identifying the ping-pong condition. In these cases, the UE may be configured to use a non-standalone mode, to deprioritize NR, to block NR, and/or the like. Thus, UE power may be conserved and signaling load may be reduced. Furthermore, complexity of implementation may be reduced relative to an ISR technique.

Figure 3:
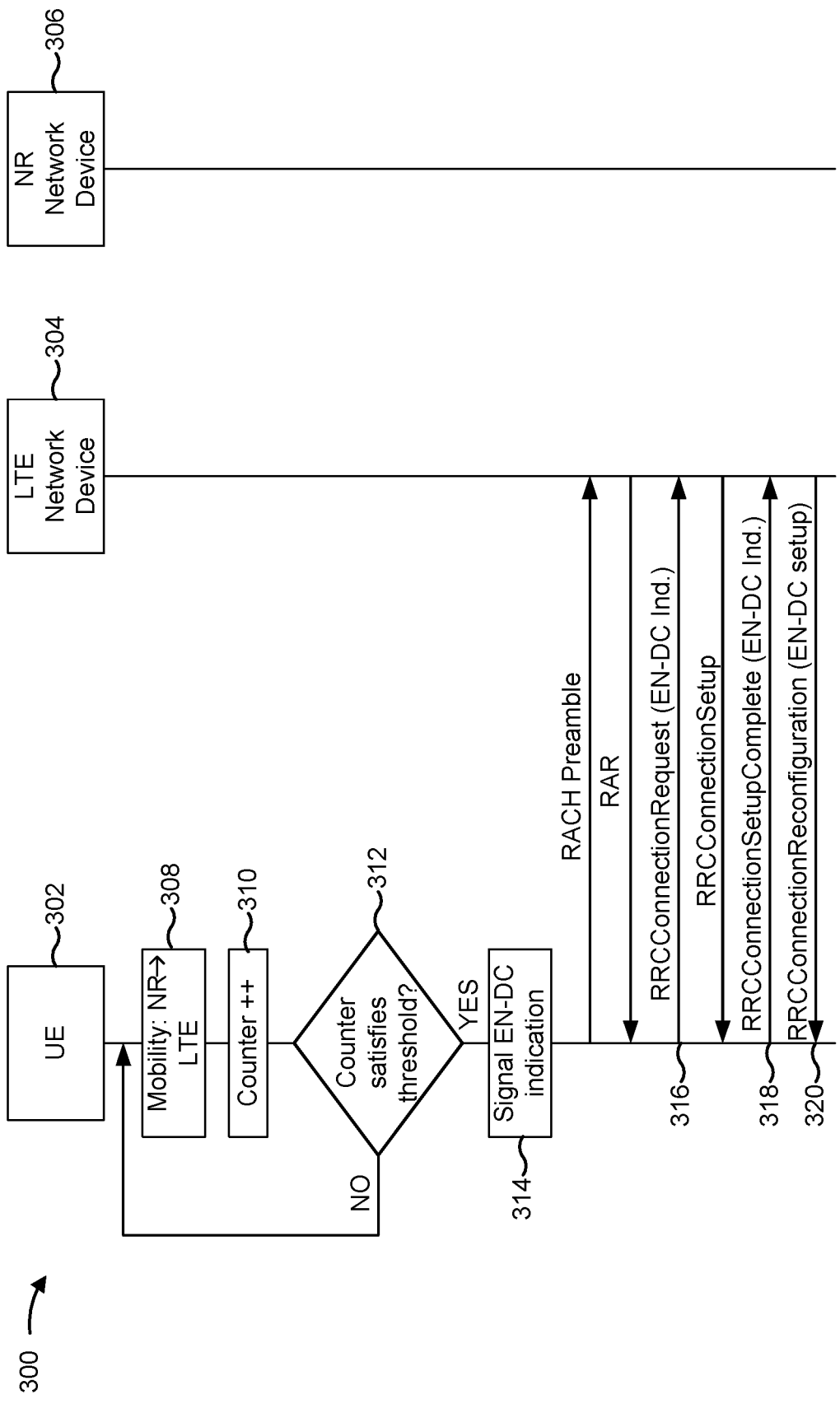
FIG. 3 is a diagram illustrating an example of a UE-side ping-pong reselection and registration avoidance technique, in accordance with various aspects of the present disclosure.

FIG. 3 is a diagram illustrating an example 300 of a UE-side ping-pong reselection and registration avoidance technique, in accordance with various aspects of the present disclosure. As shown, example 300 includes a UE 302 (e.g., UE 120 and/or the like, referred to in connection with FIG. 3 as a UE), an LTE network device 304 (e.g., a BS 110, a device or application associated with an EPC, such as a mobility management entity (MME), a network controller 130, and/or the like, referred to in connection with FIG. 3 as an LTE network device), and an NR network device 306 (e.g., a BS 110, a device or application associated with a 5G core network, such as an access management function (AMF), a network controller 130, and/or the like, referred to in connection with FIG. 3 as an NR network device).

As shown by reference number 308, the UE may perform a mobility operation from NR to LTE. For example, the UE may reselect to the LTE RAT based at least in part on poor NR coverage and/or the like. As shown by reference number 310, the UE may increment a counter based at least in part on reselecting to the LTE RAT. In some aspects, the UE may increment the counter when reselection is performed in either direction (e.g., LTE to NR or NR to LTE). In some aspects, the UE may increment the counter only when reselection is performed in a particular direction.

As shown by reference number 312, the UE may determine that a counter value of the counter satisfies a threshold (block 312—YES). When the counter value satisfies the threshold, the UE may determine that a ping-pong condition is satisfied. In some aspects, the UE may determine whether the counter value satisfies the threshold based at least in part on a time window. For example, when the time window elapses, the UE may reset the counter value, may decrement the counter value, and/or the like. As further shown, when the counter value fails to satisfy the threshold (block 312—NO), then the UE may return to reference number 308.

As shown by reference number 314, the UE may signal an indication based at least in part on the ping-pong condition being satisfied and/or based at least in part on determining that the ping-pong condition is satisfied. Here, the indication is an indication to the LTE network device to configure E-UTRAN-NR dual connectivity (EN-DC) for the UE. In some aspects, the indication may indicate to configure the UE to use a non-standalone mode, such as a dual connectivity mode (e.g., EN-DC) and/or the like. In some aspects, the UE may signal the indication to the NR network device.

As further shown, the UE may provide the indication as part of a random access channel (RACH) procedure of the UE, which may conserve UE resources that might otherwise be used to transmit a standalone message. For example, and as shown by reference numbers 316 and 318, the UE may provide the indication as part of an RRC connection request message, an RRC connection setup complete message, and/or the like. In some aspects, the UE may provide the indication using a standalone message, which may improve flexibility of signaling the indication.

As shown by reference number 320, the LTE network device (or the NR network device) may configure the UE to use the non-standalone mode. For example, the LTE network device may provide an RRC connection reconfiguration message indicating to configure the non-standalone mode. In some aspects, the UE may perform a role switch for the NR network device from a primary node to a secondary node, or may configure the LTE network device as a primary node and the NR network device as a secondary node. Thus, the UE may detect a ping-pong condition and may provide an indication that the LTE network device and/or the NR network device should rectify the ping-pong condition (e.g., by configuring the UE to use a non-standalone mode). Thus, resource usage associated with the ping-pong condition may be reduced. Furthermore, this approach may provide improved uniformity and more consistent performance relative to a UE-specific ping-ponging mitigation technique, which may be implemented differently by different UE vendors.

As indicated above, FIG. 3 is provided as an example. Other examples may differ from what is described with respect to FIG. 3.

Figure 4:
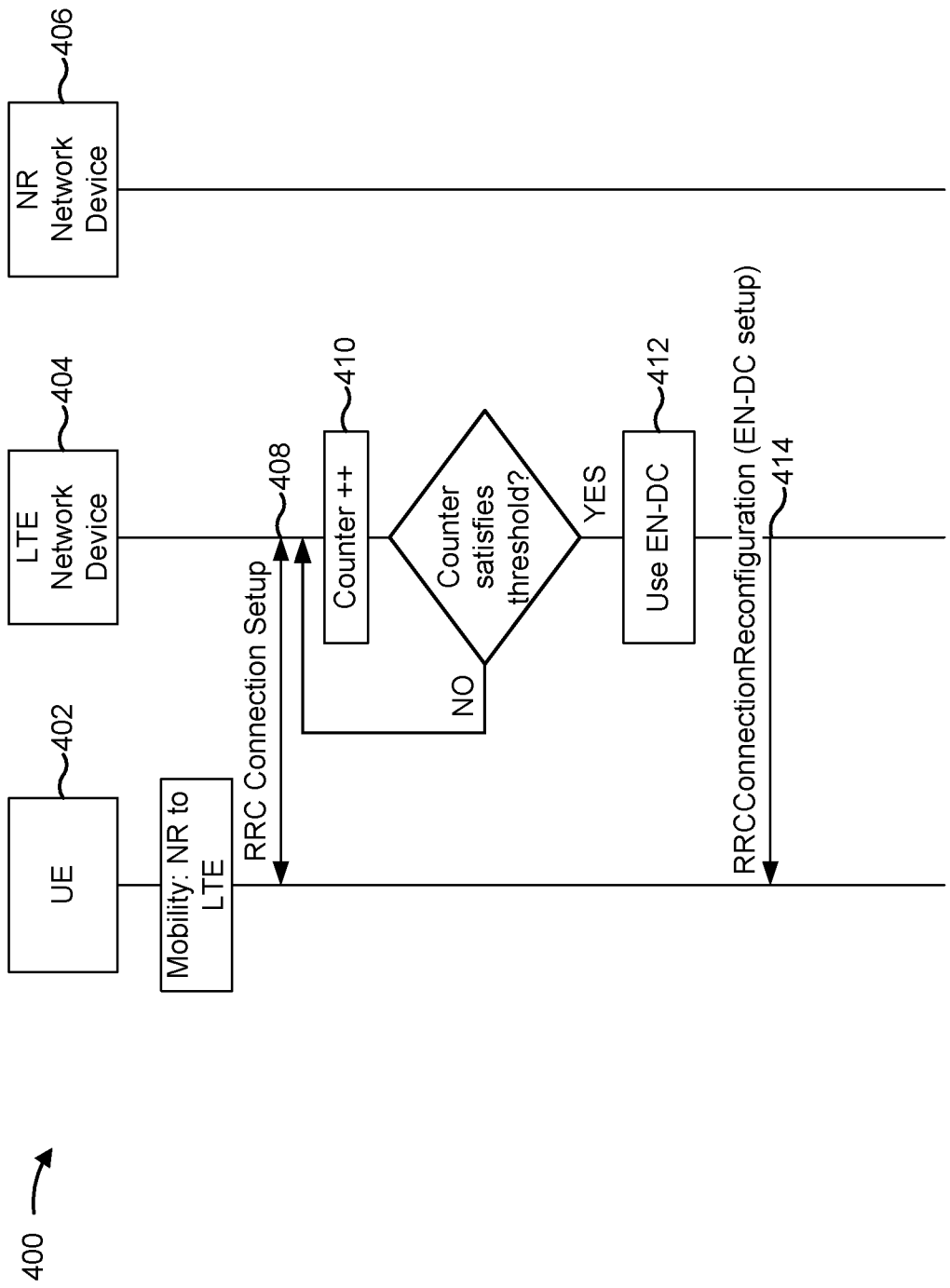
FIG. 4 is a diagram illustrating an example of an LTE-network-side ping-pong reselection and registration avoidance technique, in accordance with various aspects of the present disclosure.

FIG. 4 is a diagram illustrating an example 400 of an LTE-network-side ping-pong reselection and registration avoidance technique, in accordance with various aspects of the present disclosure. As shown, example 400 includes a UE 402 (e.g., UE 120, UE 302, and/or the like, referred to in connection with FIG. 4 as a UE), an LTE network device 404 (e.g., a BS 110, a device or application associated with an EPC, such as a mobility management entity (MME), a network controller 130, an LTE network device 304, and/or the like, referred to in connection with FIG. 4 as an LTE network device), and an NR network device 406 (e.g., a BS 110, a device or application associated with a 5G core network, such as an access management function (AMF), a network controller 130, an NR network device 306, and/or the like, referred to in connection with FIG. 4 as an NR network device).

As shown by reference number 408, the LTE network device may perform RRC connection setup with the UE based at least in part on the UE performing a mobility operation from NR to LTE. Thus, as shown by reference number 410, the LTE network device may increment a counter value associated with the UE. The counter value, and the determination of whether the ping-pong condition is satisfied based at least in part on the counter value, may be implemented similarly to the corresponding operations described in connection with FIG. 3, above. In this case, the LTE network device may track a counter value for a number of times that the LTE network device has performed RRC connection setup with the UE, for a number of times that the UE has performed the mobility operation, and/or the like.

As shown by reference number 412, when the ping-pong condition is satisfied, the LTE network device may determine that the UE is to use a non-standalone mode (e.g., a dual connectivity mode, such as an EN-DC mode, and/or the like). Accordingly, as shown by reference number 414, the LTE network device may provide an indication that the UE is to use the non-standalone mode, may configure the UE to use the non-standalone mode, may provide configuration information for the non-standalone mode to the UE, and/or the like. In this case, the LTE network device provides an RRC connection reconfiguration message that indicates to configure an EN-DC mode and/or provides setup information for the EN-DC mode. Thus, the LTE network device may detect and rectify a ping-pong condition, thereby conserving network resources and improving uniformity of UE behavior during ping-pong conditions.

As indicated above, FIG. 4 is provided as an example. Other examples may differ from what is described with respect to FIG. 4.

Figure 5:
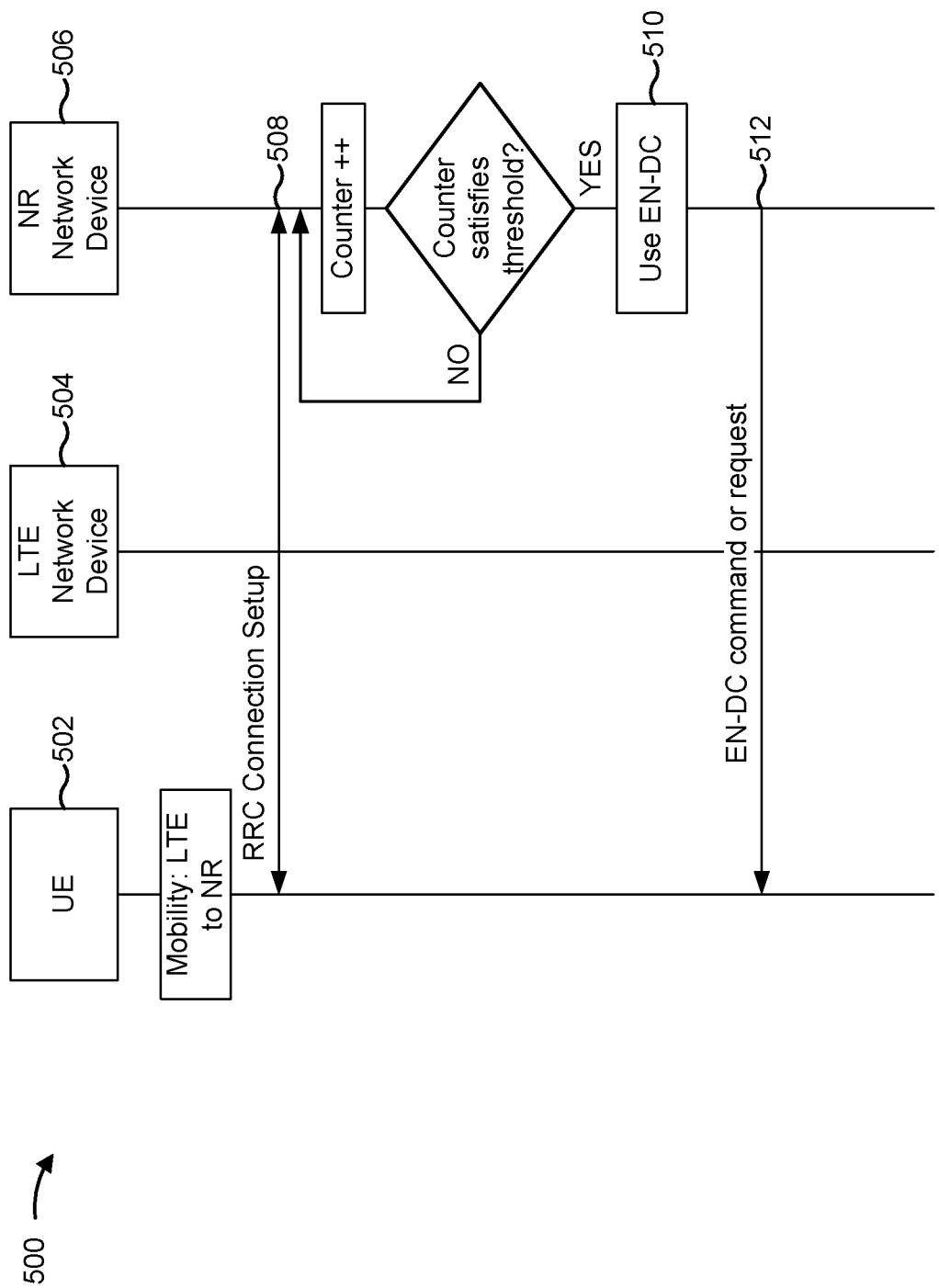
FIGS. 5 and 6 are diagrams illustrating examples of NR-network-side ping-pong reselection and registration avoidance techniques, in accordance with various aspects of the present disclosure.
Figure 6:
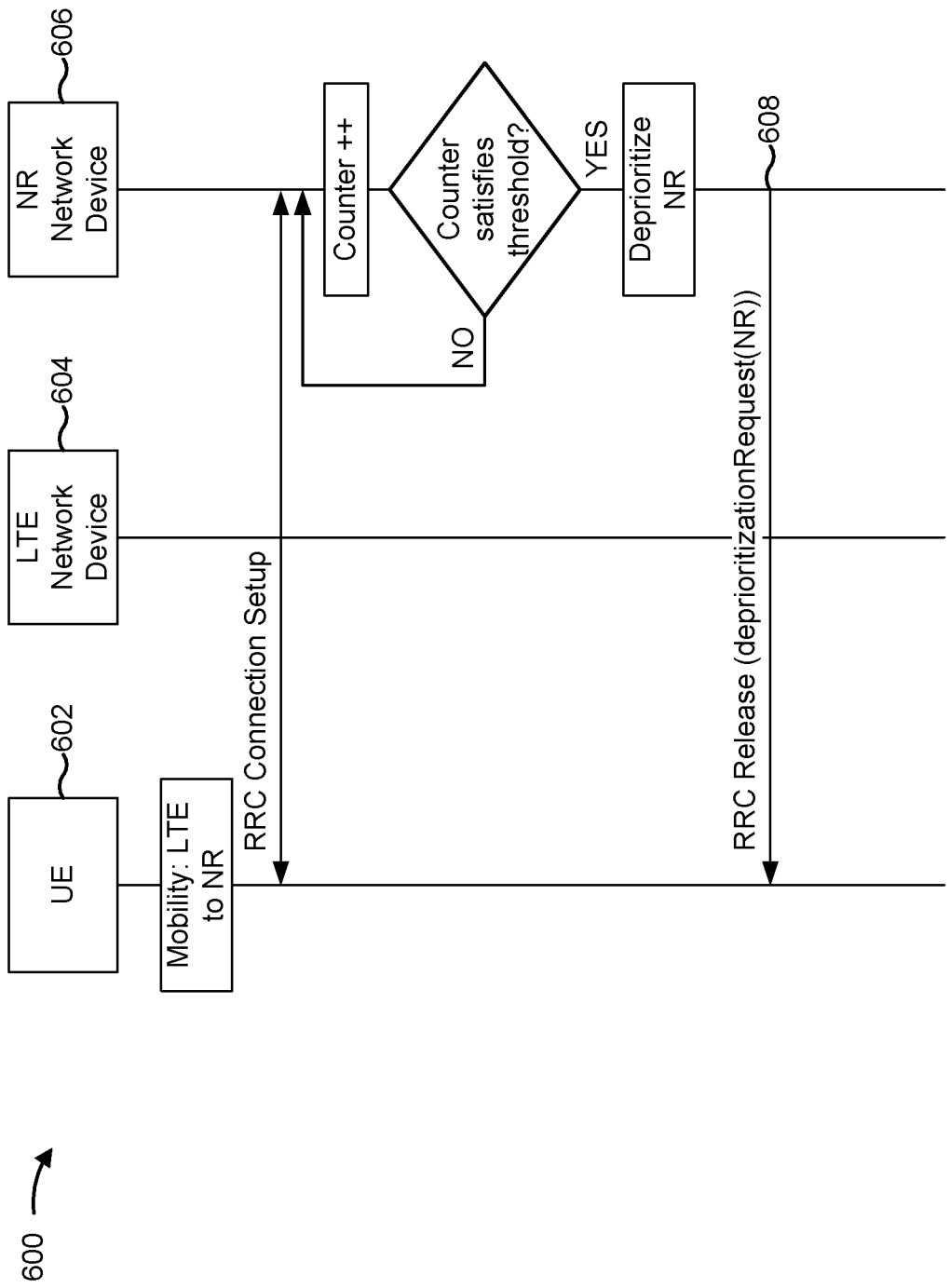

FIGS. 5 and 6 are diagrams illustrating examples 500 and 600 of NR-network-side ping-pong reselection and registration avoidance techniques, in accordance with various aspects of the present disclosure. As shown, examples 500 and 600 include a UE 502/602 (e.g., UE 120, UE 302, UE 402, and/or the like, referred to in connection with FIGS. 5 and 6 as a UE), an LTE network device 504/604 (e.g., a BS 110, a device or application associated with an EPC, such as a mobility management entity (MME), a network controller 130, an LTE network device 304, an LTE network device 404, and/or the like, referred to in connection with FIGS. 5 and 6 as an LTE network device), and an NR network device 506/606 (e.g., a BS 110, a device or application associated with a 5G core network, such as an access management function (AMF), a network controller 130, an NR network device 306, an NR network device 406, and/or the like, referred to in connection with FIGS. 5 and 6 as an NR network device).

As shown in FIG. 5, and by reference number 508, the NR network device may perform RRC connection setup with the UE based at least in part on the UE performing a mobility operation from LTE to NR. Thus, as shown, the NR network device may increment a counter value associated with the UE. The counter value, and the determination of whether the ping-pong condition is satisfied based at least in part on the counter value, may be implemented similarly to the corresponding operations described in connection with FIG. 3, above. In this case, the NR network device may track a counter value for a number of times that the NR network device has performed RRC connection setup with the UE, for a number of times that the UE has performed the mobility operation, and/or the like.

As shown by reference number 510, when the ping-pong condition is satisfied, the NR network device may determine that the UE is to use a non-standalone mode (e.g., a dual connectivity mode, such as an EN-DC mode, and/or the like). Accordingly, as shown by reference number 512, the LTE network device may provide an indication (e.g., a command or a request) that the UE is to use the non-standalone mode, may configure the UE to use the non-standalone mode, may provide configuration information for the non-standalone mode to the UE, and/or the like.

In some aspects, the NR network device may provide a command to reconfigure the UE from an NR standalone mode to an EN-DC mode. In this case, the NR network device may initiate the EN-DC mode (e.g., with the NR network device as a secondary node of the UE). In some aspects, the NR network device may provide a request to cause the UE to enter the EN-DC mode. In this case, the NR network device and/or the UE may perform a role switch of the NR network device for the EN-DC mode.

FIG. 6 illustrates an example 600 wherein the NR network device causes the UE to deprioritize the NR RAT based at least in part on the ping-pong condition being satisfied. As shown by reference number 608, in some aspects, the NR network device may transmit a message to cause the UE to deprioritize the NR RAT. For example, the message may include an RRC release message to release the RRC connection with the UE and/or the like. Here, the message includes an information element (IE) that indicates to lower the priority level of the NR RAT. Based at least in part on the message, the UE may lower a priority associated with the NR RAT (e.g., to 0, to a lowest possible value, to a lower value than a priority level associated with the LTE RAT, and/or the like). Thus, the NR network device may reduce ping-ponging of UEs in a standalone mode, thereby conserving network resources and improving uniformity of UE behavior.

In some aspects, a network device of a first RAT (e.g., the LTE network device or the NR network device) may determine whether a ping-pong condition is detected based at least in part on information from a network device of a second RAT. For example, the NR network device may receive information identifying one or more RRC connection setups from the LTE network device (or vice versa), and may determine whether the ping-pong condition is satisfied based at least in part on this information. For example, the information identifying the one or more RRC connection setups may be based at least in part on a context transfer between the network devices and/or the like. Thus, the network devices of the first RAT and the second RAT may identify ping-pong conditions based at least in part on shared information, thereby improving accuracy of identification of ping-pong conditions and reducing the likelihood of ping-ponging.

As indicated above, FIGS. 5 and 6 are provided as examples. Other examples may differ from what is described with respect to FIGS. 5 and 6.

Figure 7:
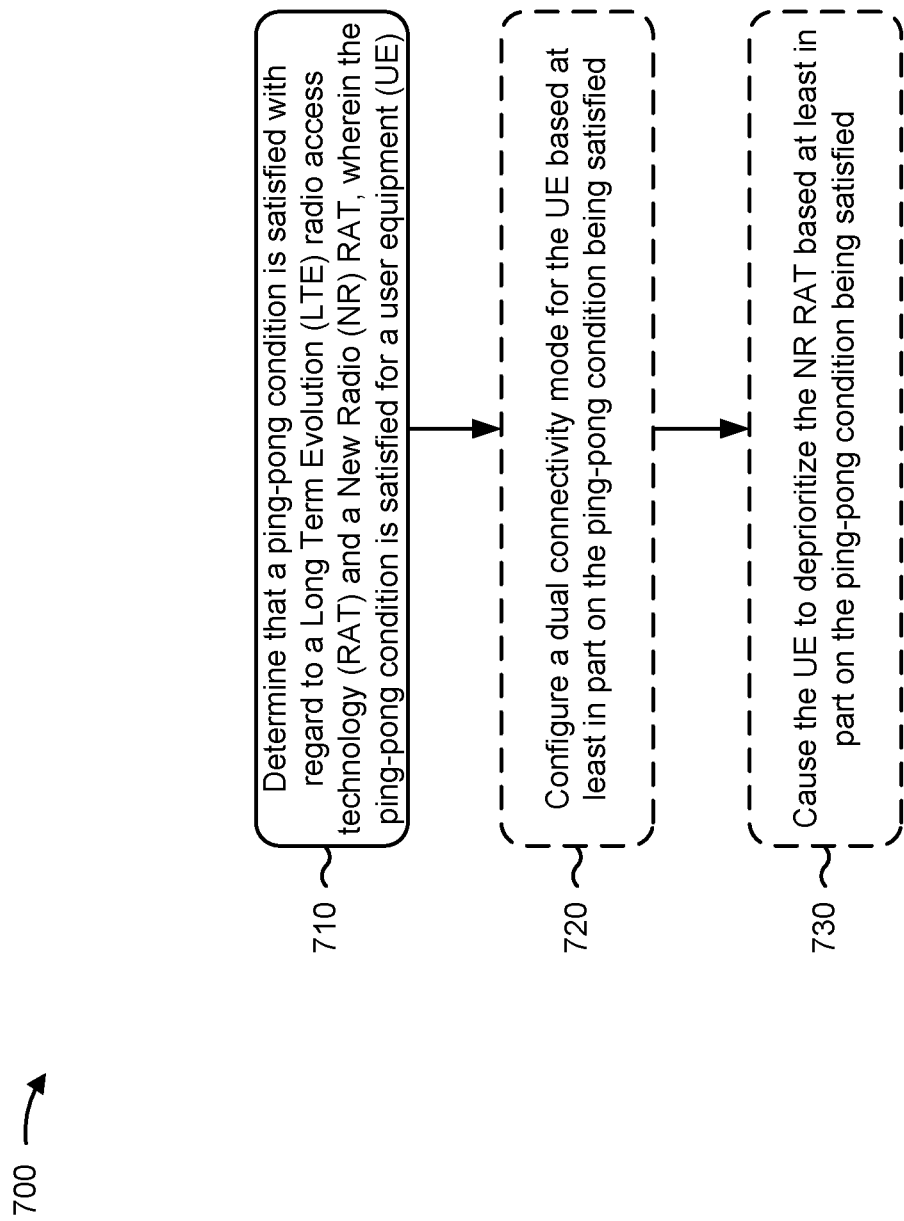
FIG. 7 is a diagram illustrating an example process performed, for example, by a network device, in accordance with various aspects of the present disclosure.

FIG. 7 is a diagram illustrating an example process 700 performed, for example, by a network device, in accordance with various aspects of the present disclosure. Example process 700 is an example where a network device (e.g., a BS 110, a device or application associated with an EPC, such as a mobility management entity (MME), a network controller 130, an LTE network device 304, an LTE network device 404, an LTE network device 504, a device or application associated with a 5G core network, such as an access management function (AMF), an NR network device 306, an NR network device 406, an NR network device 506, and/or the like) performs operations associated with radio access technology ping-pong reselection and registration avoidance.

As shown in FIG. 7, in some aspects, process 700 may include determining that a ping-pong condition is satisfied with regard to an LTE RAT and an NR RAT, wherein the ping-pong condition is satisfied for a UE (block 710). For example, the network device (e.g., using antenna 234, DEMOD 232, MIMO detector 236, receive processor 238, controller/processor 240, and/or the like) may determine that a ping-pong condition is satisfied with regard to an LTE RAT and an NR RAT, as described above. In some aspects, the ping-pong condition is satisfied for a UE.

As further shown in FIG. 7, in some aspects, process 700 may include configuring a dual connectivity mode for the UE based at least in part on the ping-pong condition being satisfied (block 720). For example, the network device (e.g., using controller/processor 240, transmit processor 220, TX MIMO processor 230, MOD 232, antenna 234, and/or the like) may configure a dual connectivity mode for the UE based at least in part on the ping-pong condition being satisfied, as described above.

As further shown in FIG. 7, in some aspects, process 700 may include causing the UE to deprioritize the NR RAT based at least in part on the ping-pong condition being satisfied (block 730). For example, the network device (e.g., using controller/processor 240, transmit processor 220, TX MIMO processor 230, MOD 232, antenna 234, and/or the like) may cause the UE to deprioritize the NR RAT based at least in part on the ping-pong condition being satisfied, as described above.

The dashed borders of blocks 720 and 730 indicate that the operations described in connection with blocks 720 and 730 can be performed in the alternative or cumulatively. For example, the network device may perform only the operation described in connection with block 720, only the operation described in connection with block 730, or both of the operations described in connection with blocks 720 and 730.

Process 700 may include additional aspects, such as any single implementation or any combination of aspects described below and/or in connection with one or more other processes described elsewhere herein.

In a first aspect, the ping-pong condition is satisfied based at least in part on a counter value satisfying a threshold, wherein the counter value is based at least in part on an occurrence of a switch between the NR RAT and the LTE RAT.

In a second aspect, alone or in combination with the first aspect, configuring the dual connectivity mode further comprises transmitting a radio resource control message to the UE that includes configuration information for the dual connectivity mode.

In a third aspect, alone or in combination with the first aspect and/or the second aspect, the dual connectivity mode comprises an E-UTRAN-NR dual connectivity (EN-DC) mode.

In a fourth aspect, alone or in combination with any one or more of the first through third aspects, configuring the dual connectivity mode further comprises switching the UE from a standalone mode on the NR RAT to a non-standalone mode on the NR RAT and the LTE RAT.

In a fifth aspect, alone or in combination with any one or more of the first through fourth aspects, the network device is associated with the LTE RAT.

In a sixth aspect, alone or in combination with any one or more of the first through fifth aspects, the network device is associated with the NR RAT.

In a seventh aspect, alone or in combination with any one or more of the first through sixth aspects, configuring the dual connectivity mode further comprises configuring a base station associated with the NR RAT as a secondary node of the UE.

In an eighth aspect, alone or in combination with any one or more of the first through seventh aspects, the network device is associated with a role associated with a primary node, wherein configuring the dual connectivity mode further comprises requesting that the UE perform a role switch of the network device to a role associated with a secondary node.

In a ninth aspect, alone or in combination with any one or more of the first through eighth aspects, causing the UE to deprioritize the NR RAT based at least in part on the ping-pong condition being satisfied further comprises transmitting a radio resource control release message indicating to deprioritize the NR RAT.

In a tenth aspect, alone or in combination with any one or more of the first through ninth aspects, configuring the dual connectivity mode further comprises requesting that the UE enter the dual connectivity mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
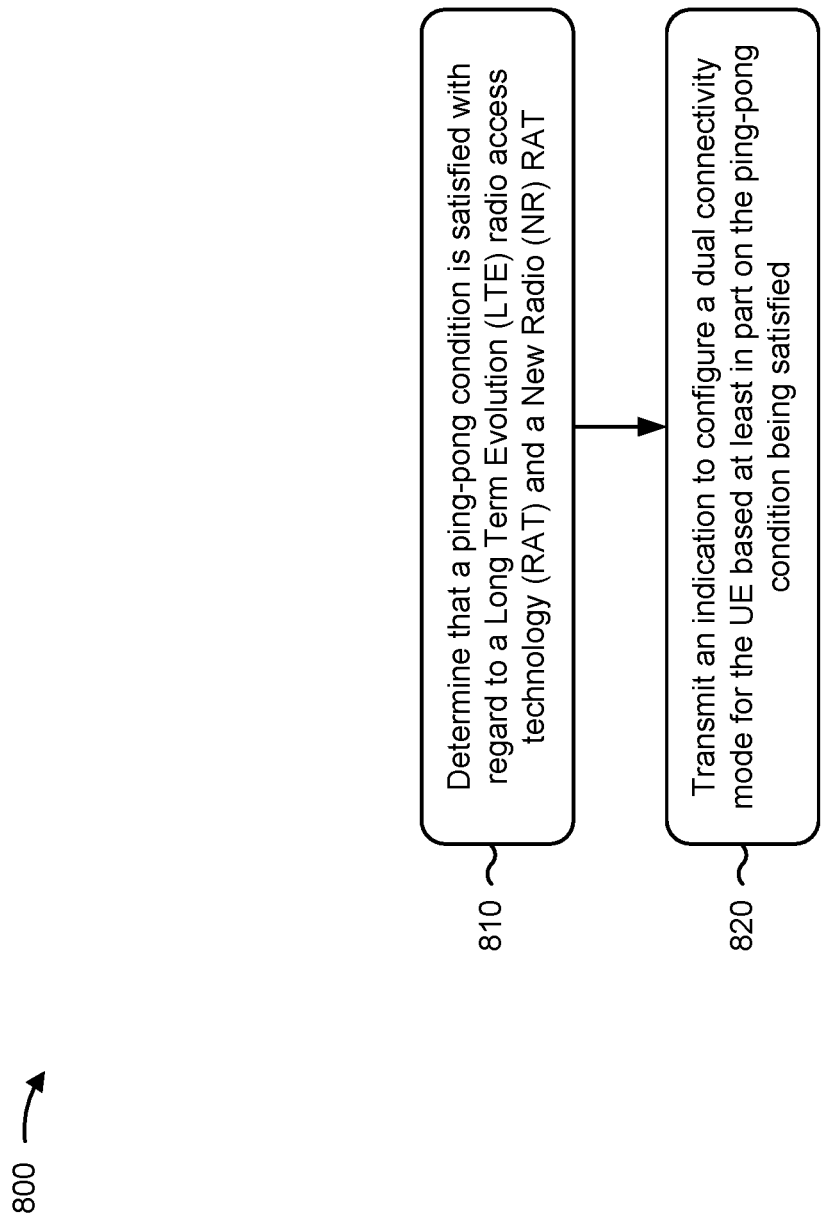
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a user equipment (e.g., user equipment 120, user equipment 302, user equipment 402, user equipment 502, and/or the like) performs operations associated with radio access technology ping-pong reselection and registration avoidance.

As shown in FIG. 8, in some aspects, process 800 may include determining that a ping-pong condition is satisfied with regard to an LTE RAT and an NR RAT (block 810). For example, the user equipment (e.g., using controller/processor 280 and/or the like) may determine that a ping-pong condition is satisfied with regard to an LTE RAT and an NR RAT, as described above.

As further shown in FIG. 8, in some aspects, process 800 may include transmitting an indication to configure a dual connectivity mode for the UE based at least in part on the ping-pong condition being satisfied (block 820). For example, the user equipment (e.g., using controller/processor 280, transmit processor 264, TX MIMO processor 266, MOD 254, antenna 252, and/or the like) may transmit an indication to configure a dual connectivity mode for the UE based at least in part on the ping-pong condition being satisfied, as described above.

Process 800 may include additional aspects, such as any single implementation or any combination of aspects described below and/or in connection with one or more other processes described elsewhere herein.

In a first aspect, the ping-pong condition is satisfied based at least in part on a counter value satisfying a threshold, wherein the counter value is based at least in part on an occurrence of a switch between the NR RAT and the LTE RAT.

In a second aspect, alone or in combination with the first aspect, the indication is transmitted in a radio resource control connection request or a radio resource control connection setup complete message.

In a third aspect, alone or in combination with the first aspect and/or the second aspect, the indication is transmitted using a random access message.

In a fourth aspect, alone or in combination with any one or more of the first through third aspects, the dual connectivity mode comprises an EN-DC mode.

In a fifth aspect, alone or in combination with any one or more of the first through fourth aspects, the UE may switch to the dual connectivity mode based at least in part on the indication.

In a sixth aspect, alone or in combination with any one or more of the first through fifth aspects, the indication is to cause the UE to be switched from a standalone mode on the NR RAT to a non-standalone mode on the NR RAT and the LTE RAT.

In a seventh aspect, alone or in combination with any one or more of the first through sixth aspects, the indication is transmitted to a base station associated with the LTE RAT.

In an eighth aspect, alone or in combination with any one or more of the first through seventh aspects, the UE may receive a request that the UE enter the dual connectivity mode.

In a ninth aspect, alone or in combination with any one or more of the first through eighth aspects, the UE may perform a role switch of a network device associated with the NR RAT to a role associated with a secondary node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network device, comprising:

determining that a ping-pong condition is satisfied with regard to a Long Term Evolution (LTE) radio access technology (RAT) and a New Radio (NR) RAT,
      wherein the ping-pong condition is satisfied for a user equipment (UE),
      wherein the ping-pong condition is satisfied based at least in part on a counter value satisfying a threshold, and
      wherein the counter value is based at least in part on an occurrence of a switch between the NR RAT and the LTE RAT; and
   configuring a dual connectivity mode for the UE based at least in part on the ping-pong condition being satisfied; or
   causing the UE to deprioritize the NR RAT based at least in part on the ping-pong condition being satisfied.

2. The method of claim 1, wherein configuring the dual connectivity mode further comprises:
   transmitting a radio resource control message to the UE that includes configuration information for the dual connectivity mode.

3. The method of claim 1, wherein the dual connectivity mode comprises an E-UTRAN-NR dual connectivity (EN-DC) mode.

4. The method of claim 1, wherein configuring the dual connectivity mode further comprises:
   switching the UE from a standalone mode on the NR RAT to a non-standalone mode on the NR RAT and the LTE RAT.

5. The method of claim 1, wherein the network device is associated with the LTE RAT.

6. The method of claim 1, wherein the network device is associated with the NR RAT.

7. The method of claim 1, wherein configuring the dual connectivity mode further comprises:
   configuring a base station associated with the NR RAT as a secondary node of the UE.

8. The method of claim 1, wherein the network device is associated with a role associated with a primary node, and wherein configuring the dual connectivity mode further comprises:
   requesting that the UE perform a role switch of the network device to a role associated with a secondary node.

9. The method of claim 1, wherein causing the UE to deprioritize the NR RAT based at least in part on the ping-pong condition being satisfied further comprises:
   transmitting a radio resource control release message indicating to deprioritize the NR RAT.

10. The method of claim 1, wherein configuring the dual connectivity mode further comprises:
    requesting that the UE enter the dual connectivity mode.

11. A network device for wireless communication, comprising:
    a memory; and
    one or more processors operatively coupled to the memory, the one or more processors configured to:
       determine that a ping-pong condition is satisfied with regard to a Long Term Evolution (LTE) radio access technology (RAT) and a New Radio (NR) RAT,
          wherein the ping-pong condition is satisfied for a user equipment (UE),
          wherein the ping-pong condition is satisfied based at least in part on a counter value satisfying a threshold, and wherein the counter value is based at least in part on an occurrence of a switch between the NR RAT and the LTE RAT; and configure a dual connectivity mode for the UE based at least in part on the ping-pong condition being satisfied; or cause the UE to deprioritize the NR RAT based at least in part on the ping-pong condition being satisfied.

12. The network device of claim 11, wherein the one or more processors, when configuring the dual connectivity mode, are further configured to:
transmit a radio resource control message to the UE that includes configuration information for the dual connectivity mode.

13. The network device of claim 11, wherein the dual connectivity mode comprises an E-UTRAN-NR dual connectivity (EN-DC) mode.

14. The network device of claim 11, wherein the one or more processors, when configuring the dual connectivity mode, are further configured to:
switch the UE from a standalone mode on the NR RAT to a non-standalone mode on the NR RAT and the LTE RAT.

15. The network device of claim 11, wherein the network device is associated with the LTE RAT.

16. The network device of claim 11, wherein the network device is associated with the NR RAT.

17. The network device of claim 11, wherein the one or more processors, when configuring the dual connectivity mode, are further configured to:
configure a base station associated with the NR RAT as a secondary node of the UE.

18. The network device of claim 11,
wherein the network device is associated with a role associated with a primary node, and
wherein the one or more processors, when configuring the dual connectivity mode, are further configured to:
request that the UE perform a role switch of the network device to a role associated with a secondary node.

19. The network device of claim 11, wherein the one or more processors, when causing the UE to deprioritize the NR RAT based at least in part on the ping-pong condition being satisfied, are further configured to:
transmit a radio resource control release message indicating to deprioritize the NR RAT.

20. The network device of claim 11, wherein the one or more processors, when configuring the dual connectivity mode, are further configured to:
request that the UE enter the dual connectivity mode.

21. A non-transitory computer-readable medium storing a set of instructions for wireless communication, the set of instructions comprising:
one or more instructions that, when executed by one or more processors of a network device, cause the network device to:
determine that a ping-pong condition is satisfied with regard to a Long Term Evolution (LTE) radio access technology (RAT) and a New Radio (NR) RAT,
wherein the ping-pong condition is satisfied for a user equipment (UE),
wherein the ping-pong condition is satisfied based at least in part on a counter value satisfying a threshold, and
wherein the counter value is based at least in part on an occurrence of a switch between the NR RAT and the LTE RAT; and
configure a dual connectivity mode for the UE based at least in part on the ping-pong condition being satisfied; or
cause the UE to deprioritize the NR RAT based at least in part on the ping-pong condition being satisfied.

22. The non-transitory computer-readable medium of claim 21, wherein the one or more instructions, that cause the network device to configure the dual connectivity mode, cause the network device to:
transmit a radio resource control message to the UE that includes configuration information for the dual connectivity mode.

23. The non-transitory computer-readable medium of claim 21, wherein the dual connectivity mode comprises an E-UTRAN-NR dual connectivity (EN-DC) mode.

24. The non-transitory computer-readable medium of claim 21, wherein the one or more instructions, that cause the network device to configure the dual connectivity mode, cause the network device to:
switch the UE from a standalone mode on the NR RAT to a non-standalone mode on the NR RAT and the LTE RAT.

25. The non-transitory computer-readable medium of claim 21, wherein the network device is associated with the LTE RAT.

26. The non-transitory computer-readable medium of claim 21, wherein the network device is associated with the NR RAT.

27. The non-transitory computer-readable medium of claim 21, wherein the one or more instructions, that cause the network device to configure the dual connectivity mode, cause the network device to:
configure a base station associated with the NR RAT as a secondary node of the UE.

28. The non-transitory computer-readable medium of claim 21, wherein the network device is associated with a role associated with a primary node, and wherein configuring the dual connectivity mode further comprises:
request that the UE perform a role switch of the network device to a role associated with a secondary node.

29. The non-transitory computer-readable medium of claim 21, wherein the one or more instructions, that cause the network device to cause the UE to deprioritize the NR RAT based at least in part on the ping-pong condition being satisfied, cause the network device to:
transmit a radio resource control release message indicating to deprioritize the NR RAT.

30. The non-transitory computer-readable medium of claim 21, wherein the one or more instructions, that cause the network device to configure the dual connectivity mode, cause the network device to:
request that the UE enter the dual connectivity mode.

31. An apparatus for wireless communication, comprising:
means for determining that a ping-pong condition is satisfied with regard to a Long Term Evolution (LTE) radio access technology (RAT) and a New Radio (NR) RAT,
wherein the ping-pong condition is satisfied for a user equipment (UE),
wherein the ping-pong condition is satisfied based at least in part on a counter value satisfying a threshold, and
wherein the counter value is based at least in part on an occurrence of a switch between the NR RAT and the LTE RAT; and means for configuring a dual connectivity mode for the UE based at least in part on the ping-pong condition being satisfied; or means for causing the UE to deprioritize the NR RAT based at least in part on the ping-pong condition being satisfied.

* * * * *